United States Patent
Yu et al.

(10) Patent No.: US 9,457,811 B2
(45) Date of Patent: Oct. 4, 2016

(54) BRAKE ASSISTED VEHICLE ENGINE RESTART ON A ROAD GRADE

(75) Inventors: Hai Yu, Canton, MI (US); Ryan A. McGee, Ann Arbor, MI (US); Ihab S. Soliman, Canton, MI (US); Mathew A. Boesch, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1726 days.

(21) Appl. No.: 12/561,502

(22) Filed: Sep. 17, 2009

(65) Prior Publication Data

US 2011/0065548 A1 Mar. 17, 2011

(51) Int. Cl.
*B60W 30/18* (2012.01)
*B60W 10/06* (2006.01)
*B60W 10/184* (2012.01)
*B60W 10/115* (2012.01)

(52) U.S. Cl.
CPC ........ *B60W 30/18118* (2013.01); *B60W 10/06* (2013.01); *B60W 10/184* (2013.01); *B60W 30/18027* (2013.01); *B60W 10/115* (2013.01); *B60W 2510/105* (2013.01); *B60W 2520/30* (2013.01); *B60W 2550/142* (2013.01); *Y10T 477/87* (2015.01)

(58) Field of Classification Search
CPC ............. B60W 10/06; B60W 10/115; B60W 10/184; B60W 30/18027; B60W 30/18118; B60W 2510/105; B60W 2520/30; B60W 2550/142

USPC ............ 701/22, 48, 51, 70, 82, 83, 87, 112, 701/113; 477/195, 102, 203, 111, 205; 303/192; 290/40 A, 40 B, 40 C, 40 D, 290/40 R

See application file for complete search history.

(56) References Cited

U.S. PATENT DOCUMENTS

| | | | | |
|---|---|---|---|---|
| 6,135,920 | A * | 10/2000 | Kamiya et al. | 477/185 |
| 6,246,944 | B1 * | 6/2001 | Maruyama | 701/70 |
| 6,404,072 | B2 * | 6/2002 | Onoyama et al. | 290/40 C |
| 6,434,475 | B2 * | 8/2002 | Kaneko et al. | 701/112 |
| 7,226,389 | B2 * | 6/2007 | Steen et al. | 477/195 |
| 7,934,589 | B2 * | 5/2011 | Groner et al. | 192/219.1 |
| 2002/0086772 | A1 * | 7/2002 | Abe et al. | 477/102 |
| 2003/0214186 | A1 * | 11/2003 | Kinder et al. | 303/192 |
| 2005/0140208 | A1 * | 6/2005 | Ji | 303/192 |

OTHER PUBLICATIONS

Rockwell Automation, Applications with Inclined and Vertical Loads, Mar. 2000, Publication D-7746, pp. 1 and 2.*

* cited by examiner

*Primary Examiner* — Dale Hilgendorf
(74) *Attorney, Agent, or Firm* — David B. Kelley; MacMillan, Sobanski & Todd, LLC (57) ABSTRACT

A method for restarting an engine of a vehicle stopped on a grade, comprising the steps of engaging a gear of a transmission through which the engine and wheels of the vehicle are driveably connected mutually, using brake pressure to engage wheel brakes and produce a road gradient wheel torque that holds the vehicle stationary on the grade, initiating an engine restart, operating the engine to produce wheel torque equal to or greater than the road gradient wheel torque, and releasing the brake pressure.

3 Claims, 8 Drawing Sheets

BRAKE ASSISTED VEHICLE ENGINE RESTART ON A ROAD GRADE

BACKGROUND OF THE INVENTION

1. Field of the Invention

This invention relates generally to a vehicle powertrain applicable to a hybrid electric vehicle (HEV). More particularly, the invention pertains to controlling the stopping and restarting of an engine on a road grade.

2. Description of the Prior Art

A HEV is a vehicle that combines a conventional propulsion system, which includes an internal combustion engine and a step-change automatic transmission, a rechargeable energy storage system that includes an electric motor and electric storage battery to improve fuel economy over a conventional vehicle.

Motor vehicles can be designed to employ certain aspects of hybrid electric technology, but without use of a hybrid electric powertrain. Certain vehicles having a conventional powertrain, but no electric machine for driving the wheels, called micro-HEVs, shutdown the engine during conditions where the engine operates at idle speed to reduce fuel consumption and reduce emissions while the vehicle is stopped.

During normal vehicle operation many instances arise where the vehicle must stop: at traffic signals, cross-walks, stop signs and the like. In micro-HEVs the engine is shut down if no power is required, e.g. while waiting at a traffic light. As soon as power is requested, the engine is automatically restarted. By avoiding an unnecessary engine idling event, the vehicle's fuel economy is improved. For this purpose, it is desirable to shut down the engine function as much as possible when certain engine stop conditions are satisfied.

A vehicle stopped on a surface that has a sufficient grade or slope and whose powertrain includes an automatic transmission, can experience a vehicle roll-back event while the engine is idling. A conventional automatic transmission is driven by the engine through a torque converter. With the vehicle on a flat surface and the engine at idle, torque transmitted to the transmission is generally sufficient to enable slight forward rolling of the vehicle, i.e., vehicle creeping. When the vehicle is on a slight grade of positive slope (3%-7%), torque transferred to the transmission is generally sufficient to hold the vehicle stationary preventing roll-back. On higher grades (7% and greater), however, vehicle roll-back can occur, causing reverse torque transfer through the transmission.

In a micro-HEV with the engine shutdown and the vehicle stationary on an uphill road grade, vehicle roll-back and reverse torque transfer effects can be worse because there is no torque output from the engine before the engine startup and insufficient traction torque during engine restart.

During an engine startup in gear process, the gradient load torque $T_{RL}$ is transferred from the wheels by the driveline to the transmission. $T_{RL}=mg \sin e^*Rw$, wherein (m) is vehicle mass and (e) is the road gradient angle and Rw is the effective tire radius. $T_{RL}$ is transmitted to the engine as additional load during an engine restart. When the hill gradient is 3% and higher, the following three problems can be observed during micro-hybrid vehicle starts on hill. First, a torque surge caused by the engine restart may bring unexpected vehicle forward motion, which is both undesirable for the vehicle and uncomfortable for the driver. Such a torque spike phenomenon will be more substantial on a descending hill. Second, additional negative torque load on the engine caused by $T_{RL}$ can stall the engine during engine restart, because the initial engine restart torque and the starter may not be large enough to drive the additional load. Third, after the engine restart, the creep torque at engine idle speed may not be sufficient to counteract the road gradient torque load on the vehicle before the driver applies the accelerator pedal. As a result, the vehicle will roll back on the incline before the drive actively depresses the accelerator pedal to power the vehicle.

SUMMARY OF THE INVENTION

A method for restarting an engine of a vehicle stopped on a hill, comprising the steps of using brake pressure to engage wheel brakes and produce reactive friction wheel torque that holds the vehicle stationary for the current road gradient, initiating an engine restart, operating the engine to produce wheel torque equal to or greater than the road gradient wheel torque, and releasing the brake pressure.

The method prevents a micro-HEV during an engine automatic restart and drive-off maneuver from rolling in a direction opposite to the direction of the driver request. The method also helps avoiding engine stall during hill restarting and unexpected vehicle acceleration jerk as the engine restarts. These advantages are realized by use of a service brake to build-up and maintain brake friction torque capability on at lease one of the driven axle wheels, as well as the undriven wheels, while the vehicle is stationary. Brake pressure may be applied and maintained either by the operator depressing the brake pedal or automatically through operation of a brake control system.

After the operator releases the service brake, the Hill Start Brake Assist (HSBA) control system retains the applied pressure in the brake system to a magnitude that is necessary to maintain the vehicle stationary on the hill and to suppress powertrain torque disturbances during the engine restart. During vehicle acceleration, the HSBA control reduces brake pressure in balance with the increasing driving torque.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
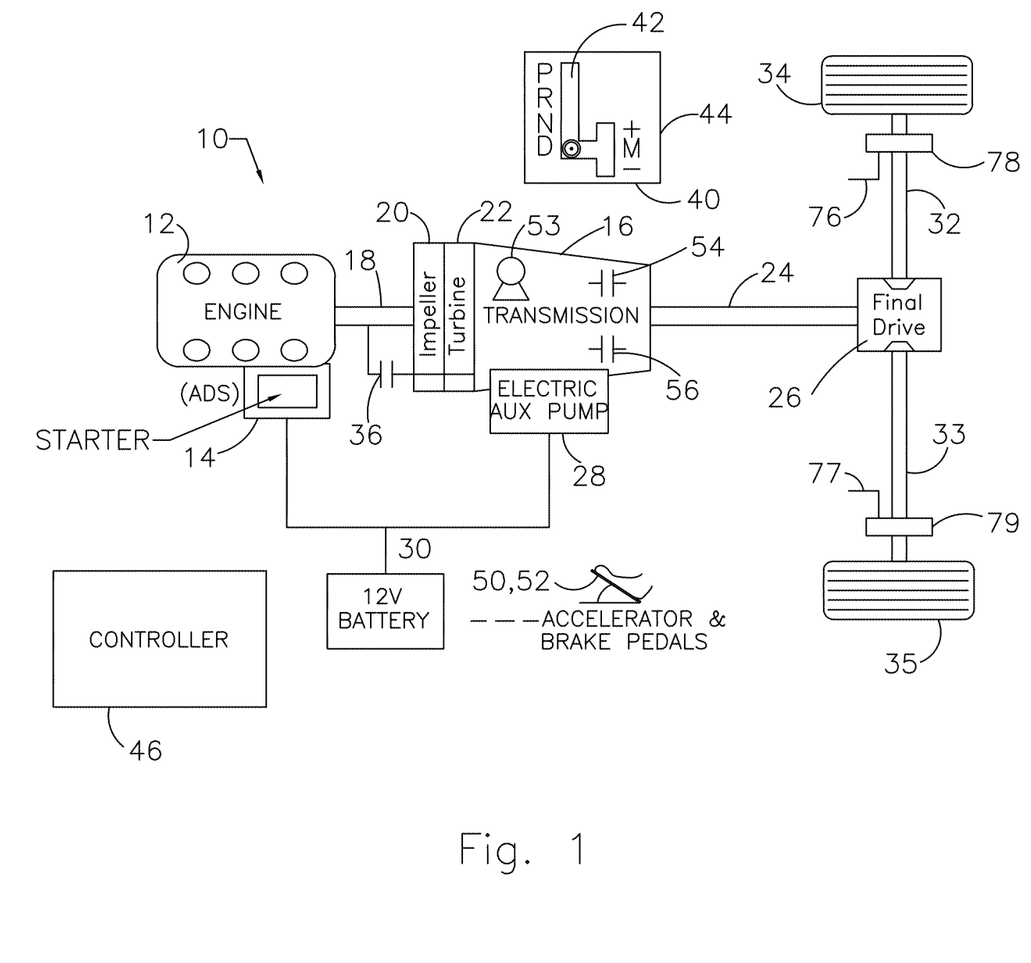
FIG. 1 is a schematic diagram of a micro-HEV powertrain.

Referring now to the drawings, the micro-HEV powertrain 10 of FIG. 1 includes a power source 12, such as an internal combustion engine; an enhanced engine starter motor 14; automatic transmission 16; input shaft 18; impeller 20, driveably connected by shaft 18 to the engine; turbine 22, hydrokinetically driven by the impeller; a torque converter lockup clutch 36; transmission output 24; final drive mechanism 26, connected to the output; an electric auxiliary hydraulic pump (EAUX) 28, whose output pressurizes the hydraulic system of the transmission; an electric storage battery 30, which supplies electric power to the pump 28 and starter 14; and axle shafts 32, 33, driveably connect to the driven wheels 34, 35 through the output 24 and final drive mechanism 26; brakes 78, 79; and brake lines 76, 77.

A gear selector 40 is moved manually by the vehicle operator among P, R, N and D positions in an automatic mode channel 42 and between upshift (+) and downshift (−) positions in a manual range mode channel 44.

Accelerator and brake pedals 50, 52, controlled manually by the vehicle operator, provide input demands to a controller 46 for changes in engine wheel torque and changes in brake force at wheel brakes 78, 79, respectively.

Located within transmission 16 are friction control elements, i.e., clutches and brakes, whose state of coordinated engagement and disengagement produce the forward gears and reverse gear. The first forward gear, low gear, is produced when at least one, but preferably two of the control elements 54, 56 are engaged concurrently. The transmission control elements, whose engagement produces the desired gear in which the vehicle will be launched, are referred to as launch elements 54, 56. Hydraulic line pressure produced by the electric auxiliary pump 28 while the engine 12 is shutdown is used to fill and stroke the launch elements 54, 56, thereby preparing the transmission 16 for responsive torque transmission once the engine restart is completed. Stroking the launch control elements 54, 56 takes up clearances between the servo pistons and a pack of friction plates in the control elements, and clearances among the friction plates. The launch elements 54, 56 have substantially no torque transmitting capacity when stroke pressure is present in the servo cylinders that actuate the launch elements.

Transmission 16 also contains a hydraulic pump 53, such as a gerotor pump or vane pump, whose output is used to produce pressure in the transmission's hydraulic circuit, through which the control elements 54, 56 are pressurized to a state of full engagement in coordination with the engine restart method.

The microprocessor-based controller 46, accessible to a hill start brake assistance (HSBA) engine restart control algorithm 70, communicates through electronic signals transmitted on a communication bus with the engine 12, starter 14, transmission 16, battery 30, auxiliary pump 28, gear shifter 40, and the accelerator and brake pedals 50, 52.

Figure 2:
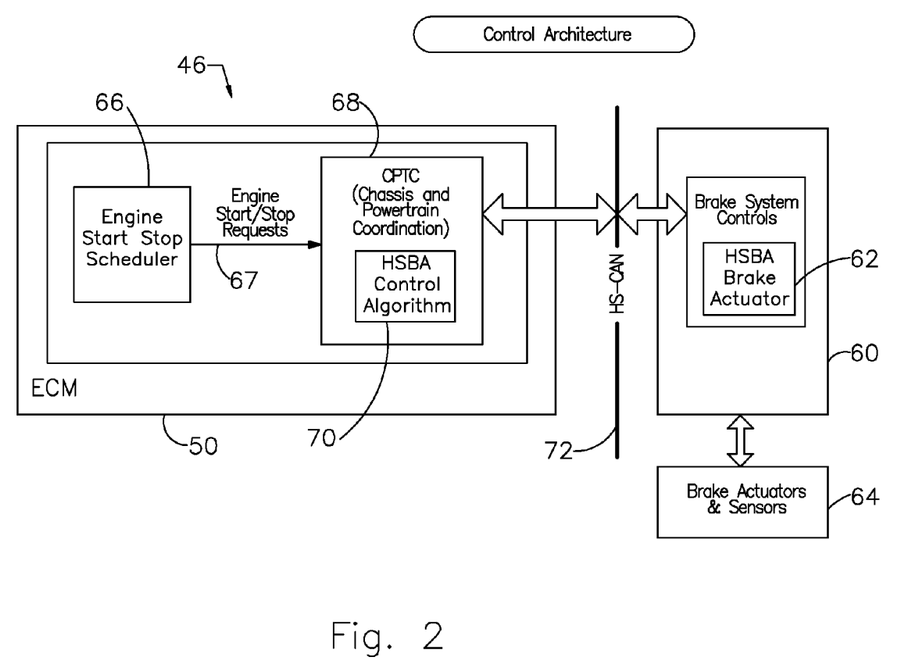
FIG. 2 is schematic diagram showing a portion of a HSBA controller.

FIG. 2 schematically illustrates controller 46. Controls 60 for the brake system, which include a HSBA brake actuator 62, receive input signals from and transmit commands to brake actuators and sensors 64. The engine control module (ECM) 50 includes an engine start-stop scheduler 66, which transmits engine start/stop requests 67 to a chassis and powertrain coordinator (CPTC) 68, which contains a HSBA engine restart control algorithm 70. The brake system controls 62 and CPTC 68 communicate through a high speed controller area network (HS-CAN) 72.

HSBA control is preferably entered when the micro-HEV is stationary, brake pedal 52 is depressed, the magnitude of the road gradient is determined, engine 12 is stopped, accelerator pedal 50 is released, the park brake is released, and gear shift selector 40 is in a Drive range position.

Figure 3:
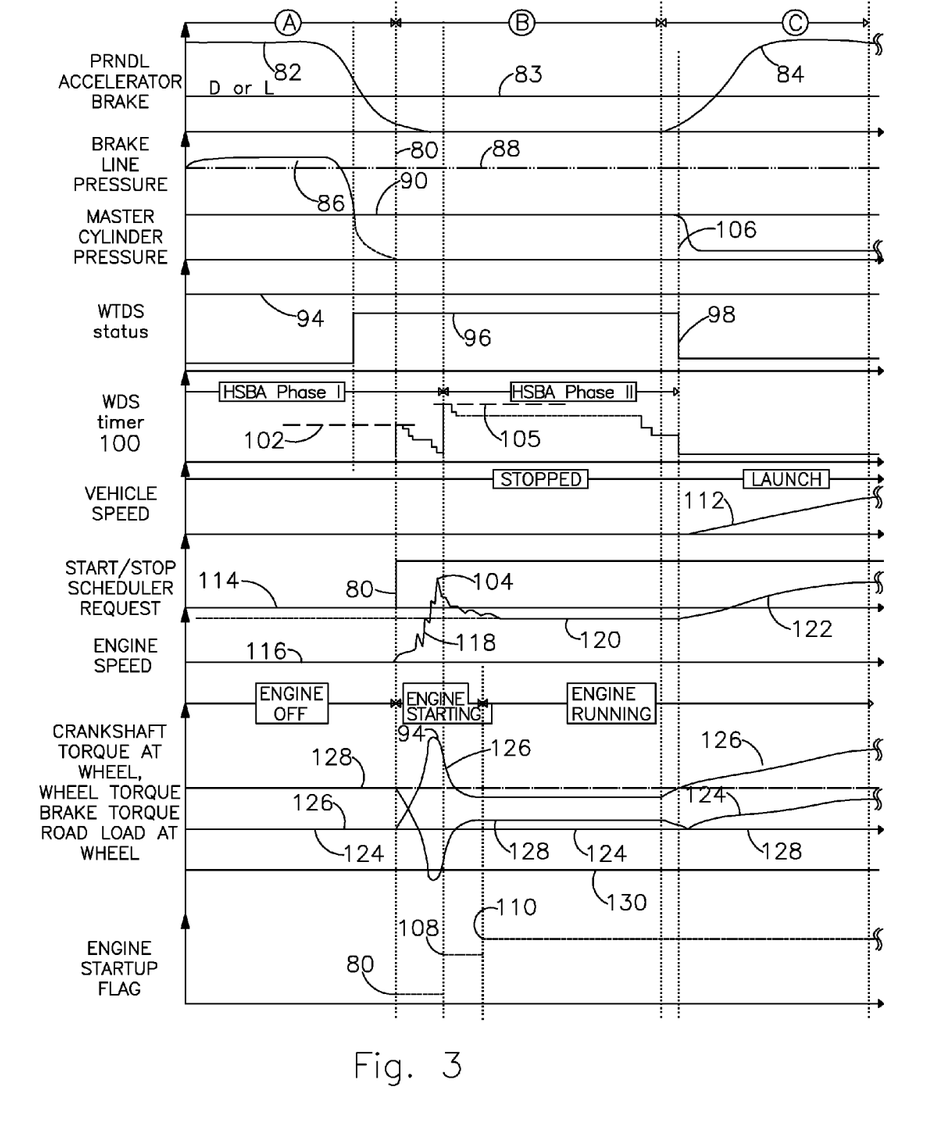
FIG. 3 contains graphs of powertrain variables during an engine restart under HSBA control on a hill whose gradient is in a medium range of road gradient.

Four use cases are illustrated in FIGS. 3-6 to demonstrate the function of the HSBA engine restart control. FIG. 3 shows graphs of powertrain variables during an engine restart under HSBA control on a hill whose gradient has a positive slope in a low road gradient range (e.g. between 3 percent and 7 percent). During period A, the vehicle is stopping and becomes stationary before the engine restart is initiated at 80 by a restart request. During period B, an engine restart is initiated and combustion becomes sustained. During period C, the vehicle launches ahead as vehicle speed on the uphill slope increases.

Graph 82 represents the application and subsequent gradual release of the brake pedal 52 while the vehicle is stopped.

Graph 83 indicates that the gear selector 40 is continually in the Drive or Low positions. While the vehicle is stopped, the magnitude of the road gradient is identified, driver applies brake pedal 52 to keep the vehicle stationary, and HSBA control is enabled.

Graph 84 represents the application of the accelerator pedal 50 following the engine restart.

The road gradient torque load $T_{RL}$, which is transmitted from the wheels 34, 35 though the driveline to the transmission 16, is $T_{RL}$=mg sin θ*Rw, wherein (m) is vehicle mass and θ is the road gradient angle, positive for uphill slope and negative for downhill slope, and Rw is the effective tire radius.

When the driver releases the brake pedal 52 and prepares to accelerate the vehicle, brake pressure 86 in lines 76, 77 is held constant through HSBA control at pressure 90 if the master cylinder pressure P_MC drops to or below a predefined pressure level P_HSBA 90. Brake pressure 90 enables the service brakes 78, 79 to counteract the road gradient torque load $T_{RL}$ and to suppress a torque spike 94 in the powertrain 10. In general, P_HSBA pressure 90 has the maximum value of either the hill hold wheel torque for the gradient load or the torque spike suppression wheel torque. Graph 88 represents the sufficiently high brake pressure level.

Graph 94 shows that HSBA control is enabled after the magnitude of the road gradient $T_{RL}$ is determined. Graph 96 represents active HSBA control after release of the brake pedal 52. Graph 98 represents active HSBA control becoming inactive when sufficient wheel torque occurs or a HSBA timer 100 expires at 106.

The engine restart is initiated at 80 by using starter 14 to crank engine 12 as brake pedal 50 is released while the gear selector 40 is in a forward drive position, i.e., the DRIVE or LOW position.

Controller 46 sets an engine starting flag 106 when the engine restart is initiated at 80, an engine speed peak passed flag at 108, and an engine running flag at 110 when sustained engine combustion occurs.

When the engine restart is initiated, the HSBA timer 100 is set to a first calibrated level 102 and begins to count down during Phase I control. If a peak 104 in engine restart speed is observed before the HSBA timer 100 counts down to zero, brake pressure 90 is maintained and timer is reset to a second calibrated level 105. If the first calibrated level 102 of HSBA timer 100 expires before the engine speed peak 104 occurs, brake pressure 90 is reduced immediately upon a release of the brake pedal 50.

If the first level 102 timer 100 does not expire before the engine running flag is set at 110, HSBA timer 100 is extended during HSBA Phase II control to the second calibrated level 105 and counts down. During HSBA Phase II control, HSBA controller 46 holds elevated brake line pressure 90 until either HSBA timer 100 expires or powertrain wheel torque is sufficient to counteract the road gradient torque load, i.e., $T_{CRANK\_WHL} \geq T_{RL}$. If the vehicle creep torque is larger than $T_{RL}$, HSBA, controller 46 reduces brake pressure 90 upon release of brake pedal 50 immediately after Phase I control. The driveline torque at the wheels $T_{CRANK\_WHL}$ is estimated based on engine speed, displacement of accelerator pedal 52 and driveline gear information. The proposed brake pressure control does not exclude the case where individual brake circuit pressure or wheel chamber pressure will be used for control action determination rather than the brake master cylinder pressure.

Graph 112 represents vehicle speed increasing from zero after sustained engine combustion occurs at 110.

Graph 114 represents the state of the engine restart request, which occurs at 80.

Graph 116, which represents engine speed, shows an increase in engine speed beginning at the start of the engine restart 80 when the starter 14 cranks the engine 12. Engine speed continues to increase following the first engine combustion 118, remains relatively steady at idle speed 120 during the period while engine combustion is sustained, and increases further 122 as engine torque increases.

Graph 124 represents wheel torque $T_{WHL}$, which is the sum of engine crankshaft torque at the wheels 34, 35 in the current gear $T_{CRANK\_WHL}$, brake torque $T_{BRK}$; and road load at the wheels $T_{RL}$ ($T_{WHL} = T_{CRANK\_WHL} + T_{BRK} + T_{RL}$. Graph 126 represents crankshaft torque $T_{CRANK\_WHL}$ at the wheels 34, 35 in the current gear. Graph 128 represents brake torque $T_{BRK}$. Graph 130 represents road gradient torque load $T_{RL}$ which is a small negative torque produced by the road gradient.

Figure 4:
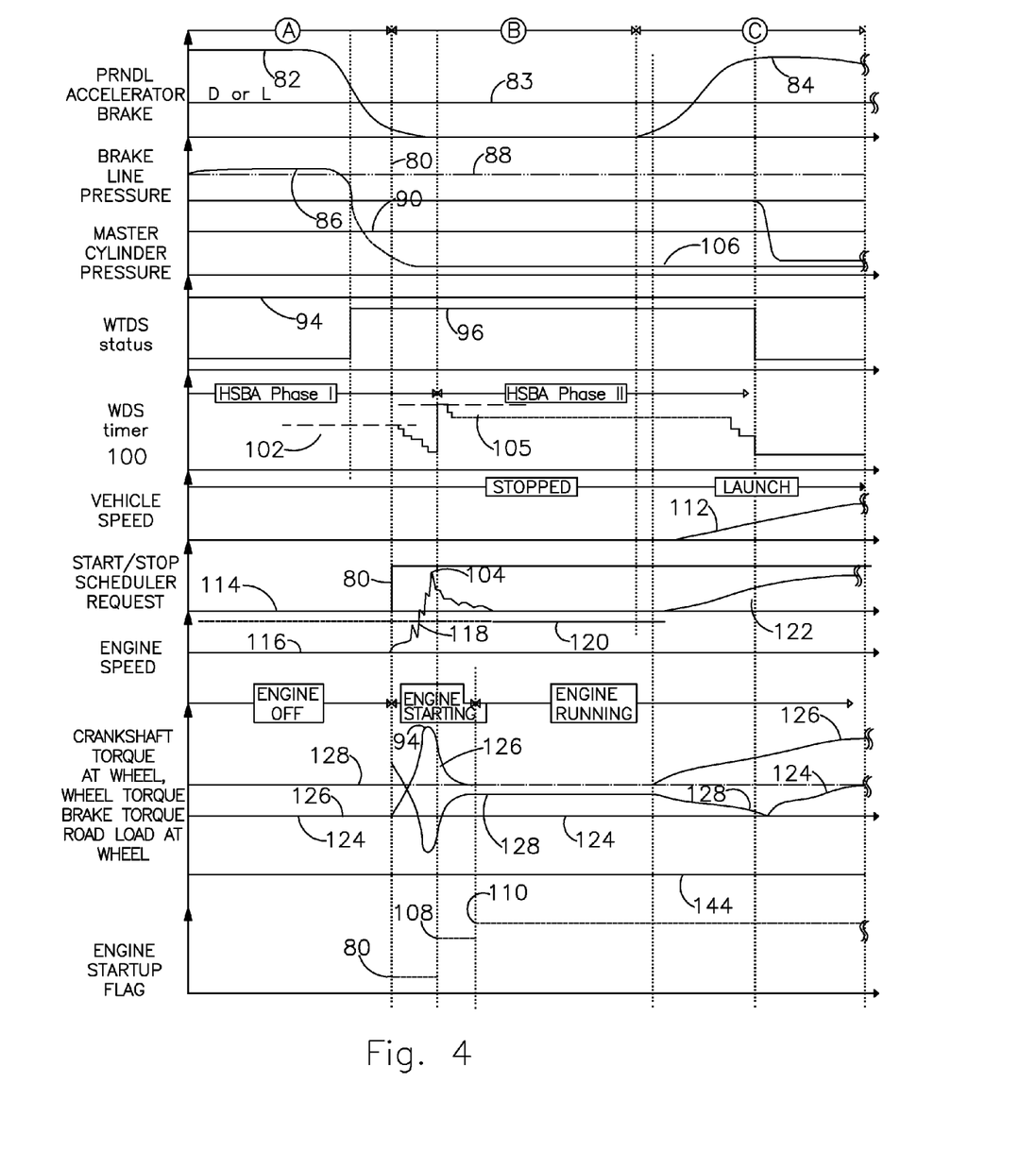
FIG. 4 contains graphs of powertrain variables during an engine restart under HSBA control on a hill whose gradient is in a high range of road gradient.

Similar to first use case of FIG. 3, the second HSBA use case shown in FIG. 4, illustrates the HSBA control function when the engine is stopped automatically and vehicle is stationary on a medium to high gradient hill with a positive slope in the range of seven percent to thirty five percent. In this case, the P_HSBA brake pressure 140 is set at pressure that is greater than brake pressure 90 corresponding to the increased road gradient torque load.

HSBA control is terminated later at 142 than in the first use case, i.e., when sufficient powertrain propulsion torque is present at wheel 34, 35 as required to counteract the larger negative road gradient torque load 144 after the driver depresses the accelerator pedal 52. The HSBA control is enabled and active even without engine 12 automatically stopped. In this situation, HSBA control goes directly to phase II and is terminated according to phase II conditions.

Figure 5:
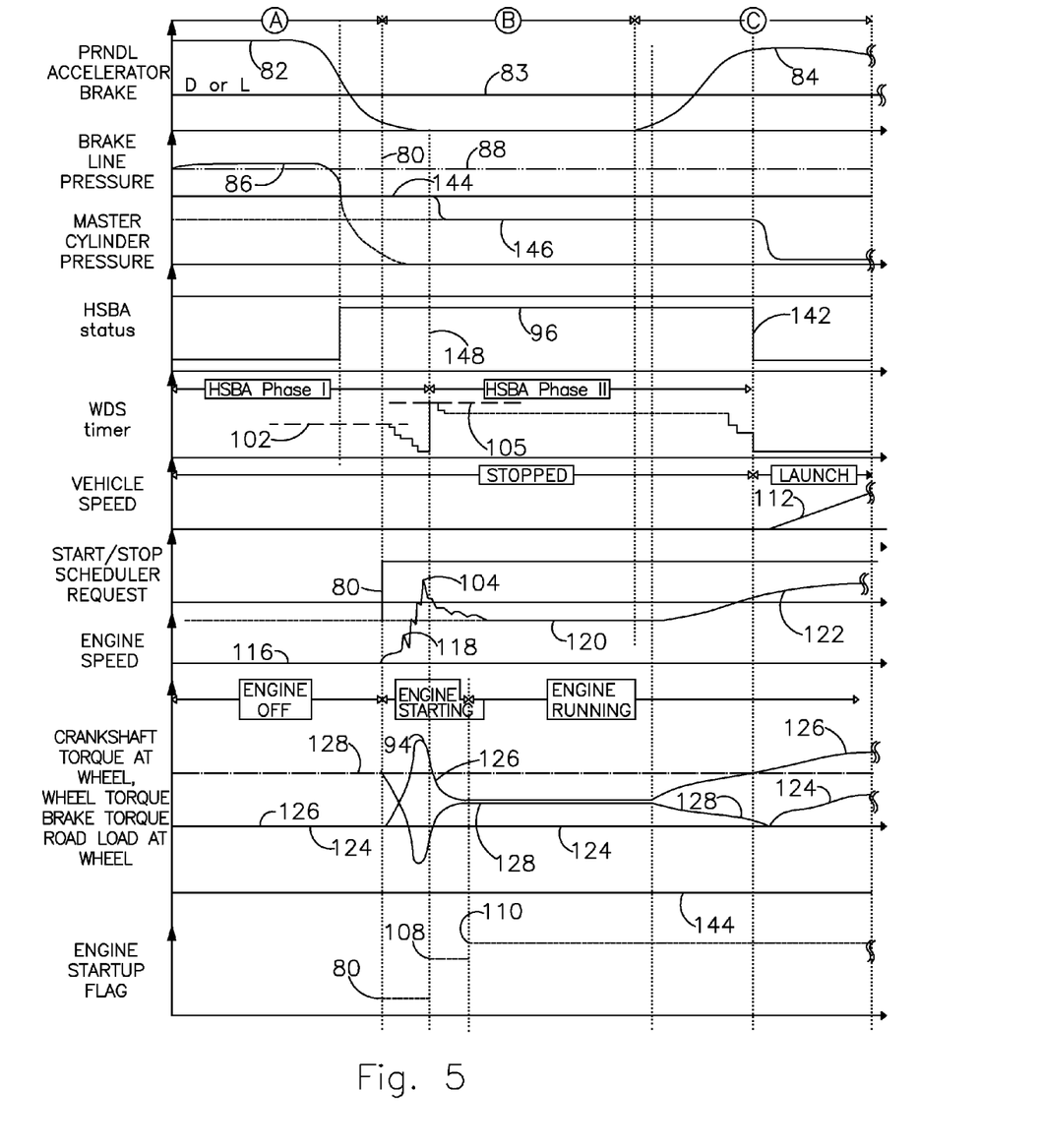
FIG. 5 contains graphs of powertrain variables during an engine restart under an alternative HSBA control to that of FIG. 4.

FIG. 5 illustrates an optional control applicable to the first and second use cases, when the brake line pressure for powertrain torque disturbance suppression 144, P_HSBA, is much larger than that of the pressure level to counteract road gradient torque load 146, P_ARL. The only difference here is the brief pressure decrease from P_HSBA to P_ARL after control phase I is completed at 148. By doing this, the brake line pressure level is kept at as low as possible to minimize the drag to vehicle drive-off motion during brake pressure release.

Figure 6:
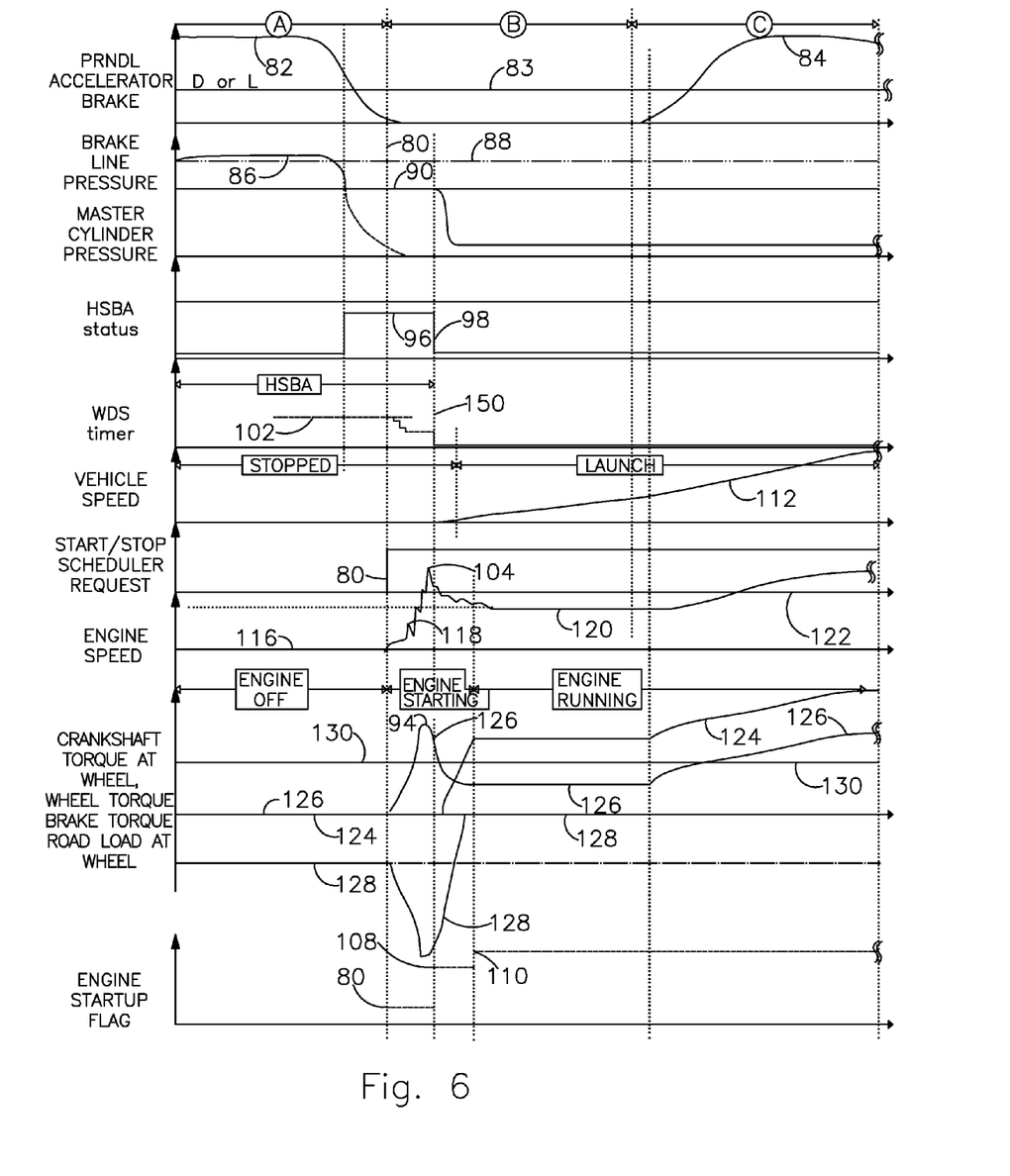
FIG. 6 contains graphs of powertrain variables during an engine restart under HSBA control on a downhill.

FIG. 6 illustrates HSBA control applied to a vehicle on a downhill, i.e., having negative slope. In this instance, the brake line pressure 90 is held at P_HSBA, i.e., at a magnitude large enough to suppress the addition of both the powertrain disturbance torque and the gradient load torque. HSBA control is terminated immediately after phase I is completed at 150, because the creep torque or road gradient torque load is expected to drive the vehicle immediately after the engine restart.

Figure 7A:
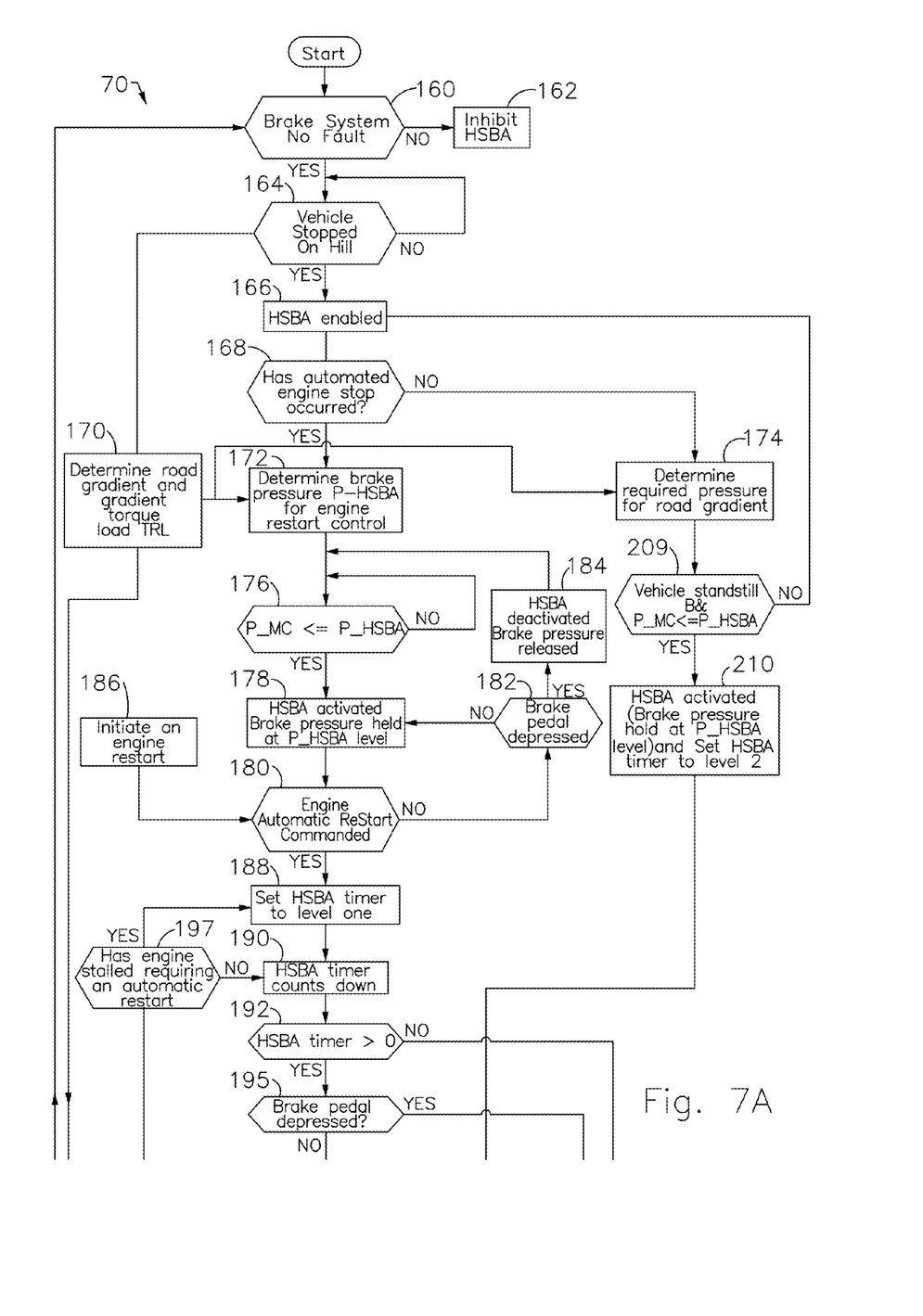
FIGS. 7A and 7B illustrate a logic flow diagram of the steps of an algorithm for controlling the engine restart.
Figure 7B:
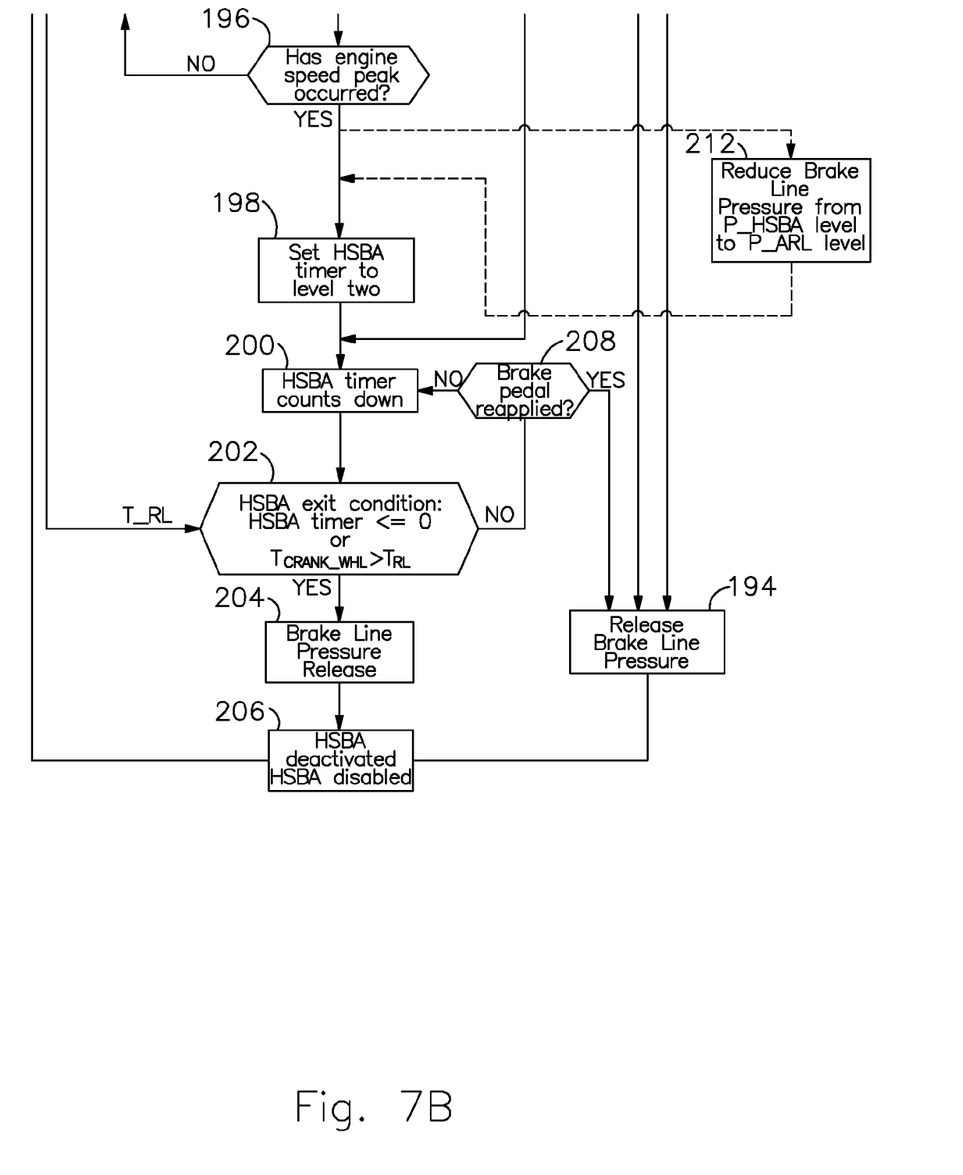

FIGS. 7A and 7B illustrate a logic flow diagram of the steps of algorithm 70 for controlling the engine restart. At step 160 a test is made to determine whether the brake system is operative. If the result of test 160 is logically false, at step 162 the HSBA control is inhibited, i.e., turned off.

If the result of test 160 is logically true, at step 164 a test is made to determine whether the vehicle is stopped on a grade or hill using information produced at step 170. If the result of test 164 is logically false, control returns to step 164. If the result of test 164 is true, at step 166 HSBA control is in enabled.

At step 168 a test is made to determine whether engine 12 is automatically stopped.

At step 170, the road gradient θ and the road gradient torque load $T_{RL}$ are determined and used as input data in steps 172, 174 and 202.

If the result of test 168 is true, at step 172 the brake pressure required for the engine restart control is determined with reference to the road gradient torque load from step 170. If the result of test 168 is false, control advances to step 174.

At step 176 a test is made to determine whether the brake system pressure is equal to or greater than pressure in the brake system master cylinder. If the result of test 176 is false control returns to step 176.

If the result of test 176 is true, at step 178 HSBA control is activated and brake pressure is held at the P_HSBA to keep the vehicle stationary.

At step 180 a test is made to determine whether an engine restart command has issued from controller 46.

If the result of test 180 is false, at step 182 a test is made to determine whether the brake pedal 50 has been reapplied. If the result of test 182 is false, control returns to step 178.

If the result of test 182 is true, at step 184 HSBA control is deactivated, brake pressure P_HSBA is released, and control returns to step 176.

At step 186, an engine restart is initiated.

At step 188, the HSBA timer 100 is set to level one, and at step 190 the timer counts down.

At step 192 a test is made to determine whether the HSBA timer 100 has not expired. If the result of test 192 is false, i.e., the timer has expired, control advances to step 194.

If the result of test 192 is true, i.e., the timer has not expired, at step 195 a test is made to determine whether the brake pedal 50 has been reapplied. If the result of test 195 is false, at step 196 a test is made to determine whether a peak in engine speed has occurred.

If the result of test 196 is false, at step 197 a test is made to determine whether engine 12 has stalled requiring another engine restart. If the result of test 197 is false, control returns to step 190. If the result of test 197 is true, control returns to step 188.

If the result of test 196 is true, at step 198 the HSBA timer 100 is set to level two, and at step 200 the timer begins to count down.

At step 202 a test is made to determine whether (i) the timer 100 has not expired or (ii) whether wheel torque produced by the engine 12 is greater than the road load torque load ($T_{CRANK\_WHL} > T_{RL}$).

If the result of test 202 is true, at step 204 brake pressure is released, allowing the vehicle to accelerate.

At step 206 HSBA control is deactivated and disabled, and control returns to step 160, whereupon algorithm 70 is reexecuted.

If the result of test 202 is false, at step 208 a test is made to determine whether brake pedal 50 has been reapplied. If the result of test 208 is false, control returns to step 200.

If the result of test 208 is true, control advances to step 194, where brake pressure is released, and to step 206.

If the result of either of tests 192 and 195 is true, control advances to step 194, where brake pressure is released, and to step 206.

If the result of test 168 is false, at step 174 the magnitude of HSBA brake pressure required for the current road gradient is determined.

At step 209, a test is made to determine whether the vehicle is stationary and whether master cylinder pressure P_MC is equal to or less than P_HSBA brake pressure. If the result of test 209 is false, control returns to step 166.

If the result of test 209 is true, at step 210 the HSBA brake pressure is applied and held constant, and timer 100 is set to level two. Then control advances to step 200, where the timer counts down.

If the result of test 196 is true, an optional logic path, which begins at step 212, addresses the condition in which brake line pressure for powertrain torque disturbance suppression P_HSBA is much larger than that of the pressure required to counteract road gradient torque load P_ARL. At step 212, brake line pressure P_HSBA is reduced to road gradient torque load pressure P_ARL, and control advances to step 198.

In accordance with the provisions of the patent statutes, the preferred embodiment has been described. However, it should be noted that the alternate embodiments can be practiced otherwise than as specifically illustrated and described.

The invention claimed is:

1. A system for restarting an engine of a vehicle stopped on a grade, comprising:
   wheels for propelling the vehicle;
   wheel brakes for alternately holding and releasing rotation of the wheels;
   a brake system for pressurizing the wheel brakes;
   the engine;
   a starter motor connectable to the engine;
   a transmission engaged in a gear through which the engine is driveably connected to the wheels; and
   a controller configured to automatically stop the engine, automatically apply brake pressure to produce wheel brake torque capacity sufficient to hold the vehicle stationary on the grade and oppose combustion torque when the engine restarts, use the starter motor to crank the engine initiating an engine restart, start a timer, automatically release brake torque if the timer expires before engine speed peaks, maintain said brake torque and reset the timer if the engine speed peaks before the timer expires, and automatically release brake torque if the reset timer expires or the engine produces a road gradient wheel torque; and
   wherein the controller is further configured to adaptively determine the brake torque with reference to road gradient information and initial combustion torque surge magnitude, and to hold the vehicle in standstill on the grade.

2. A system for restarting an engine of a vehicle stopped on a grade, comprising:
   wheels for propelling the vehicle;
   wheel brakes for alternately holding and releasing rotation of the wheels;
   a brake system for pressurizing the wheel brakes;
   the engine;
   a starter motor connectable to the engine;
   a transmission engaged in a gear through which the engine is driveably connected to the wheels; and
   a controller configured to automatically stop the engine, automatically apply brake pressure to produce wheel brake torque capacity sufficient to hold the vehicle stationary on the grade and oppose combustion torque when the engine restarts, use the starter motor to crank the engine initiating an engine restart, start a timer, automatically release brake torque if the timer expires before engine speed peaks, maintain said brake torque and reset the timer if the engine speed peaks before the timer expires, and automatically release brake torque if the reset timer expires or the engine produces a road gradient wheel torque; and
   wherein the controller is further configured to determine the brake torque for an uphill vehicle launch from the relationship $T_{HSBA} = \max(T_{RL}, T_{TSM}) + T_{sm}$, wherein $T_{TSM}$ is the torque for initial combustion torque mitigation, $T_{RS}$ is a gradient wheel torque, and $T_{SM}$ is a torque safety margin.

3. A system for restarting an engine of a vehicle stopped on a grade, comprising:
   wheels for propelling the vehicle;
   wheel brakes for alternately holding and releasing rotation of the wheels;
   a brake system for pressurizing the wheel brakes;
   the engine;
   a starter motor connectable to the engine;
   a transmission engaged in a gear through which the engine is driveably connected to the wheels; and
   a controller configured to automatically stop the engine, automatically apply brake pressure to produce wheel brake torque capacity sufficient to hold the vehicle stationary on the grade and oppose combustion torque when the engine restarts, use the starter motor to crank the engine initiating an engine restart, start a timer, automatically release brake torque if the timer expires before engine speed peaks, maintain said brake torque and reset the timer if the engine speed peaks before the timer expires, and automatically release brake torque if the reset timer expires or the engine produces a road gradient wheel torque; and
   wherein the controller is further configured to determine the brake torque for a downhill vehicle launch from the relationship $T_{HSBA} = |T_{RL}| + T_{TSM} + T_{SM}$, wherein $T_{TSM}$ is the torque for initial combustion torque mitigation, $T_{RL}$ is a gradient wheel torque, and $T_{SM}$ is a torque safety margin.

* * * * *